(12) United States Patent
Yoshida et al.

(10) Patent No.: US 6,412,960 B1
(45) Date of Patent: Jul. 2, 2002

(54) MIRROR SURFACE ANGLE ADJUSTING DEVICE AND MIRROR SURFACE ANGLE DETECTOR FOR A VEHICLE

(75) Inventors: Shigeki Yoshida; Masato Sakamoto; Junichi Nakaho; Morihiko Ogasawara, all of Aichi-ken (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 0 days.

(21) Appl. No.: 09/659,489

(22) Filed: Sep. 11, 2000

(30) Foreign Application Priority Data

Sep. 14, 1999 (JP) .......................................... 11-260853
Apr. 17, 2000 (JP) ........................................ 2000-115581

(51) Int. Cl.$^7$ ................................................ G02B 5/08
(52) U.S. Cl. ........................ 359/843; 359/874; 248/481
(58) Field of Search ................. 359/843, 871, 359/874, 876, 873; 248/466, 476, 479, 481–487

(56) References Cited

U.S. PATENT DOCUMENTS 4,678,295 A * 7/1987 Fisher ........................ 359/874
4,915,493 A * 4/1990 Fisher et al. ................ 359/874
5,993,018 A * 11/1999 Hattori et al. ............... 359/872
6,254,242 B1 * 7/2001 Henion et al. .............. 359/873

* cited by examiner

Primary Examiner—Cassandra Spyrou
Assistant Examiner—Alessandro V. Amari
(74) Attorney, Agent, or Firm—Nixon Peabody LLP; Thomas W. Cole

(57) ABSTRACT

A mirror surface angle detector which can be used in common with a mirror surface angle adjusting device of a mirror. The mirror surface angle of the mirror is adjusted by oscillation of the mirror by the mirror surface angle adjusting device. The mirror surface angle detector for detecting the mirror surface angle of the mirror is provided separately from the mirror surface angle adjusting device, and is incorporated into the mirror surface angle adjusting device such that engagement claws provided at the mirror surface angle detector engage with engagement holes provided at the mirror surface angle adjusting device. When the mirror surface angle detector is removed from the mirror surface angle adjusting device, the mirror surface angle adjusting device can also be used in a type of vehicle which does not have a mirror surface angle detector in the mirror surface angle adjusting device. Therefore, vehicles of different types can make common use of the mirror surface angle adjusting device.

19 Claims, 14 Drawing Sheets

MIRROR SURFACE ANGLE ADJUSTING DEVICE AND MIRROR SURFACE ANGLE DETECTOR FOR A VEHICLE

BACKGROUND OF THE INVENTION

1. Field of the Invention

The present invention relates to a mirror surface angle adjusting device which can adjust the angle of mirror surfaces of external mirror devices (mirrors), such as door mirrors or fender mirrors of a vehicle, in order to confirm the rear field of vision, and to a detector which is incorporated into the mirror surface angle adjusting device and can detect the angle of the mirror surfaces.

2. Description of the Related Art

There have been two types of external mirror devices (mirror surface angle adjusting devices) for a vehicle: an external mirror device which has a mirror surface angle detector and an external mirror device which does not have a mirror surface angle detector. Due to reasons of design or complexity of structure, each type of external mirror device has generally been produced separately with respectively different designs. That is, main parts have not been shared in practice.

SUMMARY OF THE INVENTION

An object of the present invention is to provide a compact and economical mirror surface angle adjusting device in which the mirror surface angle detector is made compact and rational, a mounting structure for the mirror surface angle detector is designed, which has compatibility in that main component parts thereof are made compatible with those of a mirror surface angle detector, and which can quickly accommodate various needs.

In order to solve the aforementioned problems, an external rear-view mirror device for a vehicle in accordance with the present invention includes a holder having opposite sides, one side being a mirror mounting surface on which a mirror is mounted; a base disposed at the side of the holder opposite the mirror mounting surface, the base being adapted for mounting to a vehicle; a spherical bearing portion connecting the holder to the base so that the holder is pivotable around two axes that are substantially orthogonal to one another; and a detector detachably mounted on the base and operable for producing mirror position information relative to each of the axes.

Another external mirror device in accordance with the present invention includes a holder having opposite sides, one side being a mirror mounting surface on which a mirror is mounted; a base disposed at the side of the holder opposite the mirror mounting surface, the base being adapted for mounting to a vehicle; a spherical bearing portion connecting the holder to the base so that the holder is pivotable around two axes that are substantially orthogonal to one another; a driving section having two rods for driving the holder in a pivotal manner, each rod having opposite ends, one end of each of the rods being connected to the holder and the other end being engaged with the base; and a detector for detecting mirror position relative to each of the axes, the detector comprising a body, electrical resistors, and two shafts, the two shafts being slidably supported with respect to the body of the detector, one end of each of the shafts being engaged with the holder and the other end being engaged with a corresponding electrical resistor provided at the detector body.

A further aspect of the present invention provides a detector for detecting mirror position in an external rear-view mirror device of a vehicle. The rear-view device has a base connected to the vehicle, and a mirror in a holder, with the holder pivotally supported on the base, thereby permitting mirror movement around substantially orthogonal axes. The detector includes: (a) a body adapted for detachable mounting to the base of the rear-view mirror device; (b) two electrical resistors provided at the body; and (c) two shafts supported slidably relative to the body, each shaft having opposite ends with one end of each shaft being engageable with the holder, and the other end of each shaft being engaged with one of the resistors, wherein each shaft is engaged with a different resistor.

DETAILED DESCRIPTION OF THE PREFERRED EMBODIMENTS

First Embodiment

Figure 5:
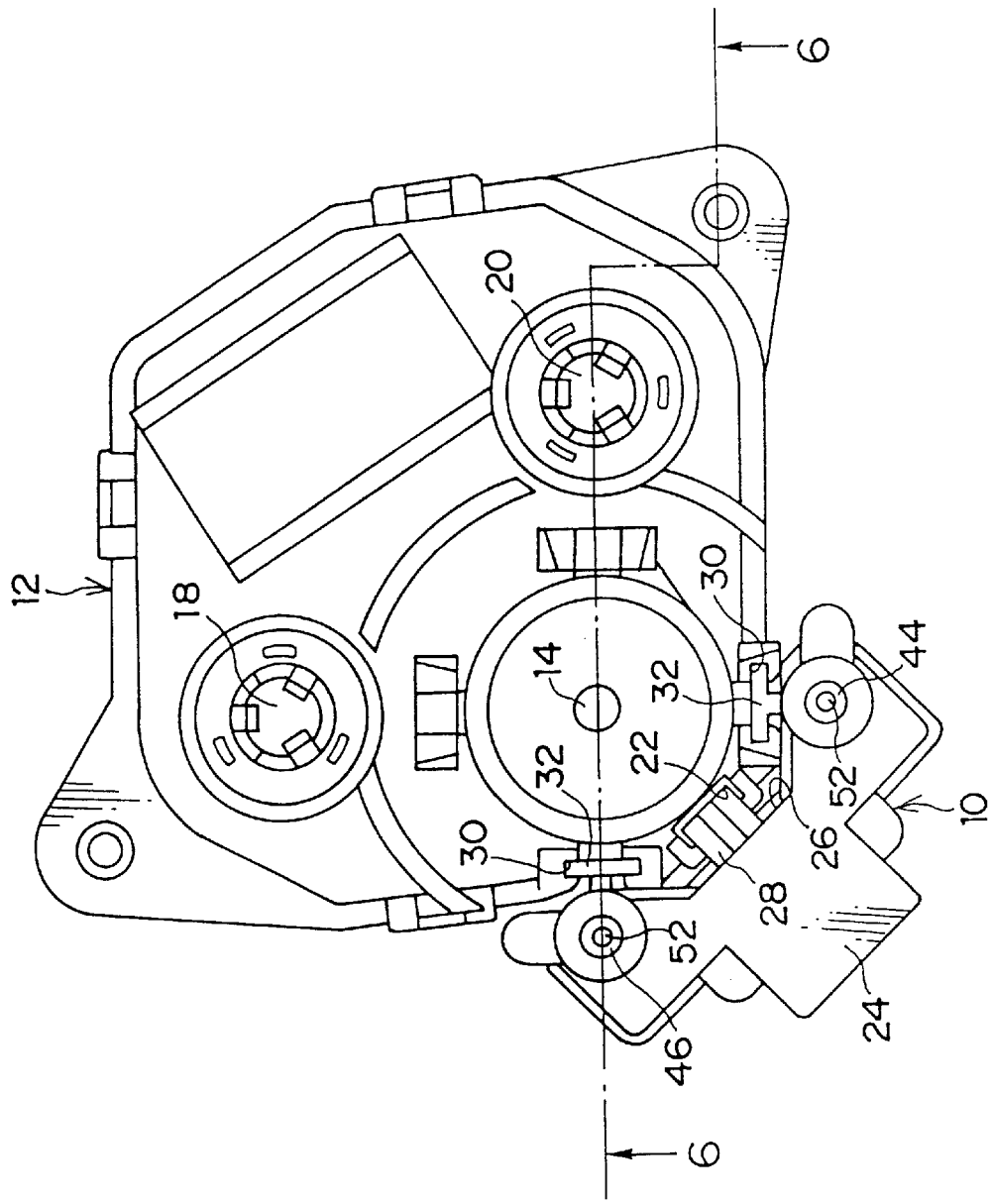
FIG. 5 is a plan view of a mirror surface angle adjusting device on which a detector is mounted.
Figure 6:
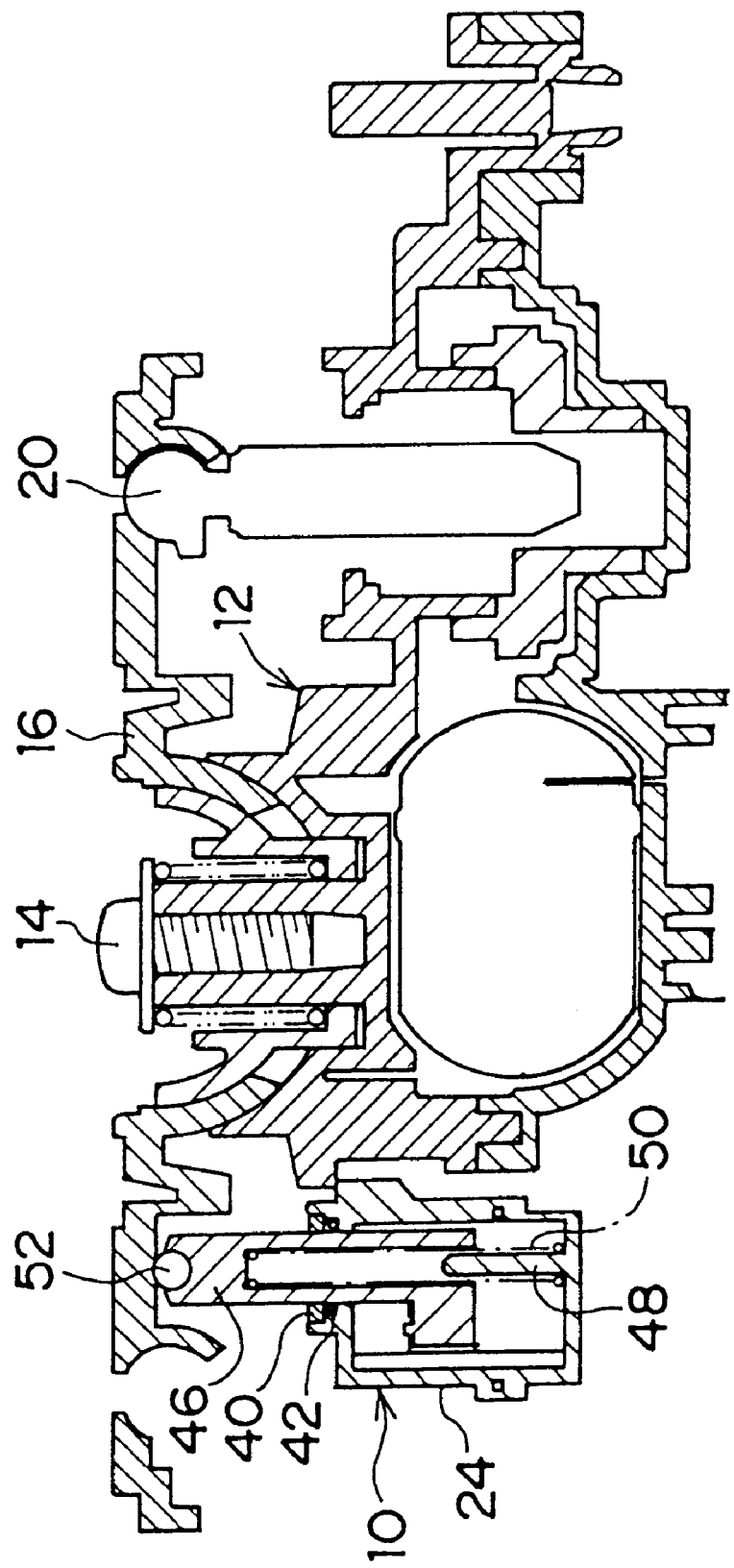
FIG. 6 is a cross-sectional view along line 6—6 in FIG. 5.

In FIG. 5, a mirror surface angle detector 10 and a mirror surface angle adjusting device 12 into which the mirror surface angle detector 10 is incorporated are illustrated in a plan view as seen from a rear of a vehicle, and in FIG. 6, the mirror surface angle detector 10 and the mirror surface angle adjusting device 12 are illustrated in a cross-sectional view.

The mirror surface angle adjusting device 12 is used, for example, for a door mirror or a mirror (an unillustrated right-side door mirror for a vehicle) for visually confirming the rear field of vision of the vehicle, has a substantially rectangular parallelopiped shape, and is fixed within a mirror visor (not shown). A holding portion 14 is provided on the side of the mirror surface angle adjusting device 12 which faces the rear of the vehicle. The holding portion 14 holds, in an oscillating manner, a resin-made mirror holder 16 fixed on the backface side of the mirror body. The position at which the mirror is held by the holding portion 14 corresponds to the center of gravity of the mirror. A bar-shaped rod for vertical movement 18 is movably provided above the holding portion 14, and the tip of the rod for vertical movement 18 is rotatably held by the mirror holder 16. A bar-shaped rod for horizontal movement 20 is movably provided at the outer side of the holding portion 14, and the tip of the rod for horizontal movement 20 is rotatably held by the mirror holder 16. The rod for vertical movement 18 and the rod for horizontal movement 20 are connected to an elevator (not shown) which serves as an oscillating means. The rod for vertical movement 18 and the rod for horizontal movement 20 are respectively moved by the elevator in the longitudinal direction of the vehicle, thereby adjusting the mirror surface angle of the mirror by oscillating the mirror around the holding portion 14. During this operation, the mirror is oscillated vertically by a movement of the rod for vertical movement 18, and horizontally by a movement of the rod for horizontal movement 20.

Figure 4:
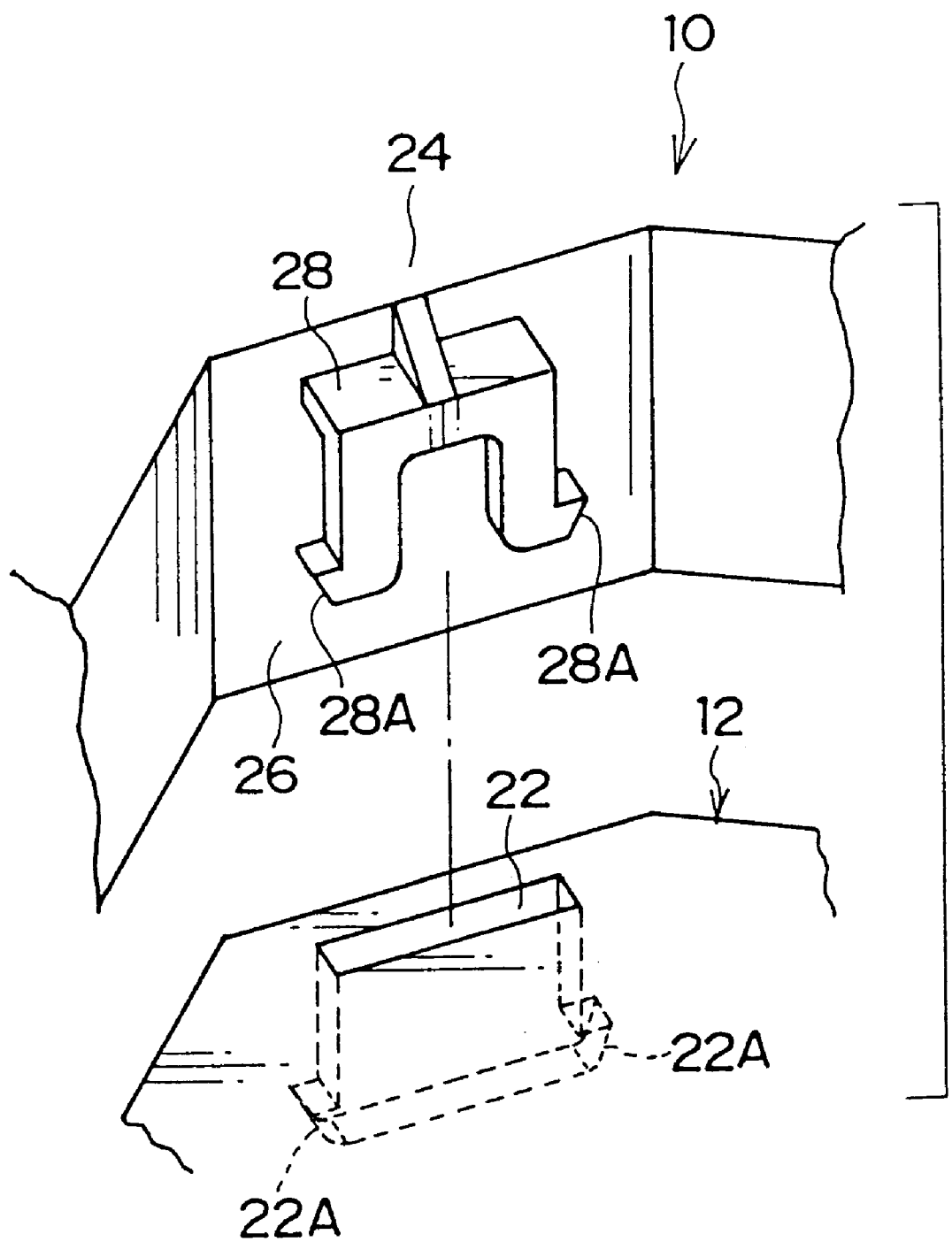
FIG. 4 is a perspective view showing the relationship between an engagement claw of the detector illustrated in FIG. 1 and an engagement hole of a mirror surface angle adjusting device.

As shown in detail in FIG. 4, an engagement hole 22 is formed at a lower, inner end portion of the mirror surface angle adjusting device 12, and an engagement claw 28 (described later) is fit together with the engagement hole 22. At the bottom portion of the engagement hole 22, a pair of recessed portions for fixation 22A are formed. The diameter at the bottom portion of the engagement hole 22 is expanded by the pair of recessed portions for fixation 22A. Moreover, as shown in FIG. 5, positioning holes 30 are formed at both sides of the engagement hole 22.

Figure 1:
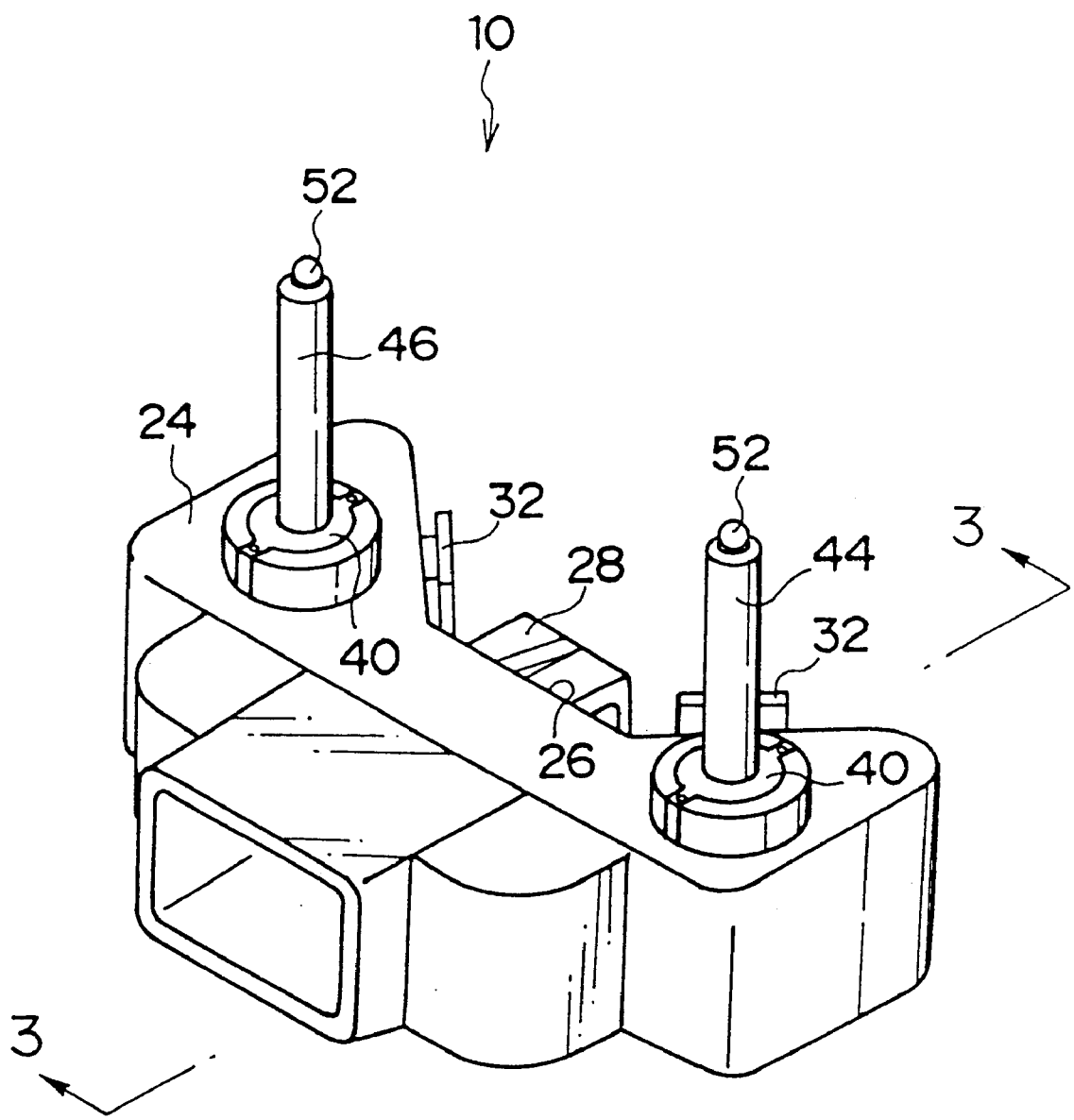
FIG. 1 is a perspective view of a mirror surface angle detector according to a first embodiment of the present invention.
Figure 2:
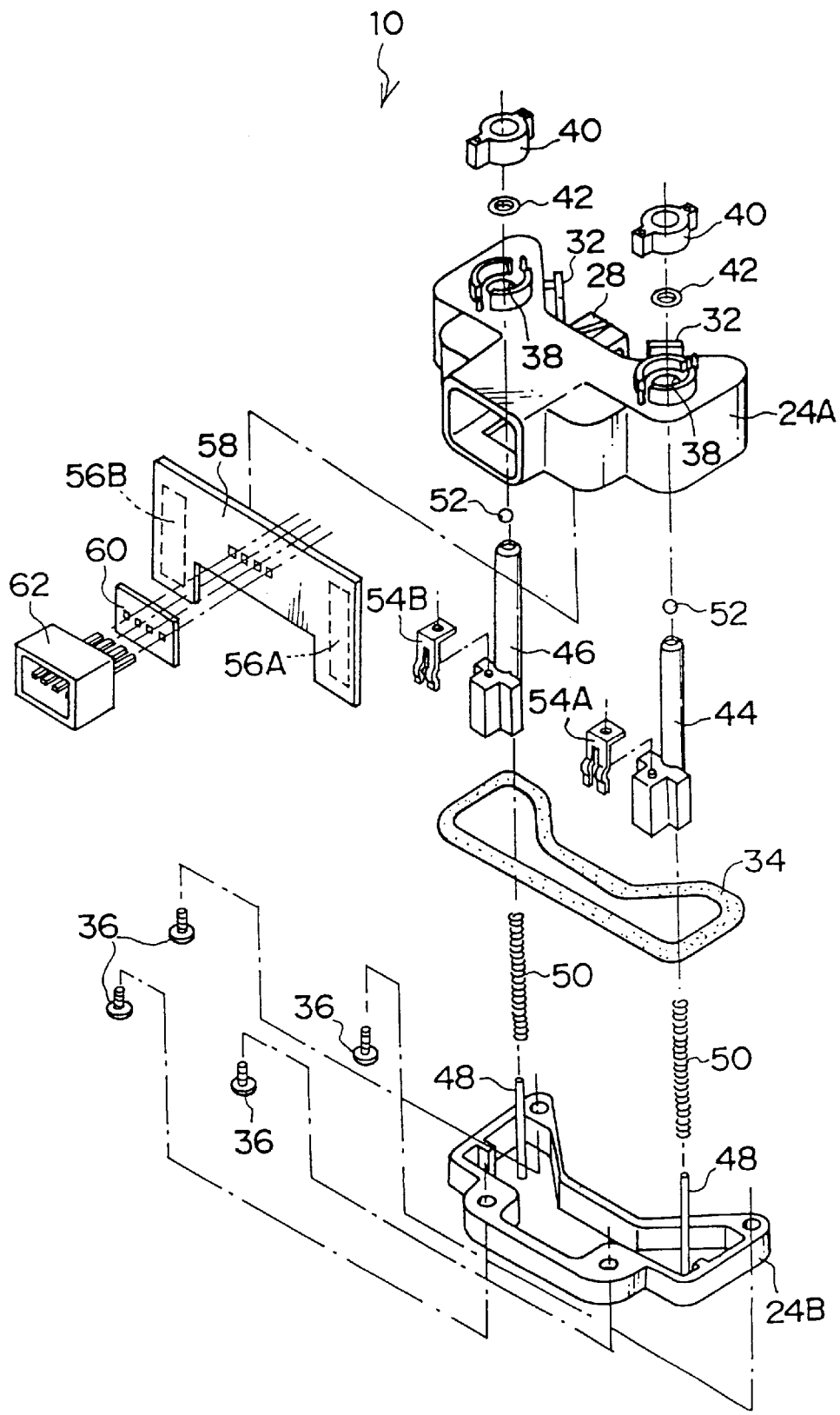
FIG. 2 is an exploded perspective view of the detector illustrated in FIG. 1.
Figure 3:
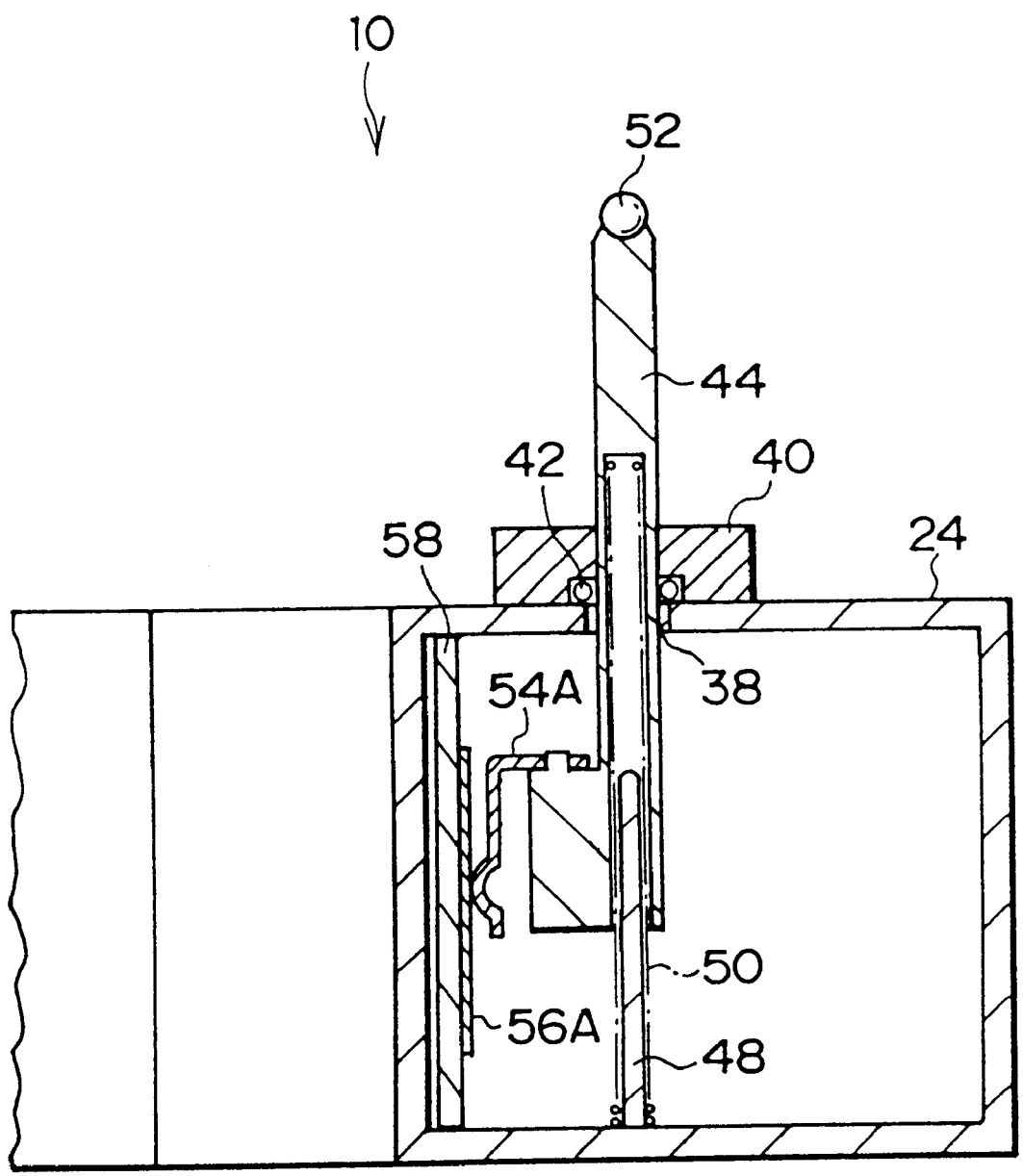
FIG. 3 is a cross-sectional view of the detector along line 3—3 in FIG. 1.

In FIG. 1, the mirror surface angle detector 10 is illustrated in a perspective view, and in FIG. 2, the mirror surface angle detector 10 is illustrated in an exploded perspective view. In FIG. 3, the mirror surface angle detector 10 is illustrated in a cross-sectional view.

The mirror surface angle detector 10 is disposed separately from the mirror surface angle adjusting device 12, and is of the so-called slider-volume type. The mirror surface angle detector 10 is provided with a box-shaped housing 24. The housing 24 has a wall surface 26 which is disposed at the side which faces the mirror surface angle adjusting device 12 and is recessed in a substantially U-shaped cross-section which corresponds to the mirror surface angle adjusting device 12. The engagement claw 28 with an L-shaped cross-section is provided in the middle part of the wall surface 26. The side of the engagement claw 28 at which tips are formed has a substantial U-shape, and protruding portions for fixation 28A protruding outward are formed at the tips of the engagement claw 28 (see FIG. 4). The engagement claw 28 is fit together with the above-described engagement hole 22, thereby incorporating the mirror surface angle detector 10 in the mirror surface angle adjusting device 12. Moreover, the protruding portions for fixation 28A are fit together with the recessed portions for fixation 22A, thereby strongly fixing the mirror surface angle detector 10 to the mirror surface angle adjusting device 12. Further, positioning claws 32 with a substantially L-shaped cross-section are provided at both sides of the engagement claw 28. When the positioning claws 32 are fit into the positioning holes 30, the mirror surface angle detector 10 is prevented from coming loose with respect to the mirror surface angle adjusting device 12.

As illustrated in detail in FIG. 2, the housing 24 is structured by a first housing 24A and a second housing 24B. The first housing 24A and the second housing 24B are assembled with bolts in a state in which a rubber waterproof packing 34 is sandwiched between the first housing 24A and the second housing 24B. Moreover, a pair of penetration holes 38 are formed on the housing 24 (the first housing 24A) in the direction of the rear of the vehicle. Cylindrical bushings 40 are attached by being fit around the pair of the penetration holes 38 in a state in which each of the penetration holes 38 and the cylindrical bushings 40 sandwich a rubber O-ring 42.

A shaft for vertical movement 44 and a shaft for horizontal movement 46, which are substantially cylindrical and made of resin, are partially housed in the housing 24. The shaft for vertical movement 44 is provided beneath the holding portion 14 of the mirror surface angle adjusting device 12, and the shaft for horizontal movement 46 is provided at the inner side (i.e., towards the vehicle) of the holding portion 14. Also, the tip of each of the shaft for vertical movement 44 and the shaft for horizontal movement 46 protrudes from each of the pair of penetration holes 38 of the housing 24. In each of the shaft for vertical movement 44 and the shaft for horizontal movement 46, rod-shaped guide pins 48 provided in the housing 24 (the second housing 24B) are inserted respectively from an end side. The shaft for vertical movement 44 and the shaft for horizontal movement 46 are guided by the guide pins 48 so as to be displaceable in the axial directions. Moreover, the shaft for vertical movement 44 and the shaft for horizontal movement 46 are urged by compression coil springs 50 toward the mirror, so that the tip of each of the shaft for vertical movement 44 and the shaft for horizontal movement 46 always abuts the mirror holder 16 of the mirror. When the mirror surface angle of the mirror is adjusted in accordance with an oscillation of the mirror by the mirror surface angle adjusting device 12, the shaft for vertical movement 44 and the shaft for horizontal movement 46 are displaced in the axial direction as a result of the oscillation of the mirror. During this operation, the shaft for vertical movement 44 is displaced as a result of the oscillation of the mirror in the vertical direction, and the shaft for horizontal movement 46 is displaced as a result of the oscillation of the mirror in the horizontal direction.

A spherical, stainless abutting member 52 is fixed at the tip of each of the shaft for vertical movement 44 and the shaft for horizontal movement 46, thereby reducing friction caused at the abutting surface between the tips of the shaft for vertical movement 44 and the shaft for horizontal movement 46 and the mirror holder 16. A slide contact for vertical movement 54A and a slide contact for horizontal movement 54B, which form a part of a detecting means, are respectively fixed at the end of each of the shaft for vertical movement 44 and the shaft for horizontal movement 46. Each of the slide contact for vertical movement 54A and the slide contact for horizontal movement 54B is always in contact with a resistor for vertical movement 56A and a resistor for horizontal movement 56B (described later), respectively.

Moreover, the mirror is supported at five points by the holding portion 14, the shaft for vertical movement 44, the shaft for horizontal movement 46, the rod for vertical movement 18 and the rod for horizontal movement 20. The rod for vertical movement 18 and the rod for horizontal movement 20 face the shaft for vertical movement 44 and the shaft for horizontal movement 46 respectively across the center of gravity of the mirror body (the position at which the mirror surface angle adjusting device 12 is held by the holding portion 14). Accordingly, the mirror is supported in a stable manner, and chattering caused by vibration of the mirror body is prevented from occurring.

The resistor for vertical movement 56A and the resistor for horizontal movement 56B forming a part of the detecting means are provided in the housing 24 to respectively correspond to the slide contact for vertical movement 54A and the slide contact for horizontal movement 54B. When the shaft for vertical movement 44 and the shaft for horizontal movement 46 are displaced in the axial direction in accordance with the oscillation of the mirror by the mirror surface angle adjusting device 12, the slide contact for vertical movement 54A and the slide contact for horizontal movement 54B respectively slide against the resistor for vertical movement 56A and the resistor for horizontal movement 56B. Moreover, the resistor for vertical movement 56A and the resistor for horizontal movement 56B are held by a plate-shaped resistor plate 58. A connector 62 is mounted on the resistor plate 58 via a spacer 60, thereby connecting a detecting mechanism (not shown in the drawings) forming a part of the detecting means to the resistor for vertical movement 56A, the resistor for horizontal movement 56B, the slide contact for vertical movement 54A, and the slide contact for horizontal movement 54B.

When the slide contact for vertical movement 54A and the slide contact for horizontal movement 54B are respectively slid against the resistor for vertical movement 56A and the resistor for horizontal movement 56B, voltage between the rear end portion (standard portion (i.e., primary position)) of each of the resistor for vertical movement 56A and the resistor for horizontal movement 56B and each of the slide contact for vertical movement 54A and the slide contact for horizontal movement 54B changes. Accordingly, the above-described detecting mechanism (not shown) detects the mirror surface angle of the mirror by measuring the voltage between the rear end portion of each of the resistor for vertical movement 56A and the resistor for horizontal movement 56B and each of the slide contact for vertical movement 54A and the slide contact for horizontal movement 54B. At this time, the mirror surface angle of the mirror in the vertical direction is detected in response to the displacement of the shaft for the vertical movement 44, and the mirror surface angle of the mirror in the horizontal direction is detected in response to the displacement of the shaft for horizontal movement 46.

Operation of the present embodiment will be described hereinafter.

In the mirror surface angle adjusting device 12 having the above-described structure, the rod for vertical movement 18 and the rod for horizontal movement 20 of the mirror surface angle adjusting device 12 are moved by an elevator (not shown), whereby the mirror is oscillated around the holding portion 14 and the mirror surface angle of the mirror is adjusted. At this time, the mirror is oscillated in the vertical direction due to the movement of the rod for vertical movement 18, and the mirror is oscillated in the horizontal direction due to the movement of the rod for horizontal movement 20.

On the other hand, when the mirror surface angle of the mirror is adjusted by the mirror surface angle adjusting device 12, the shaft for vertical movement 44 and the shaft for horizontal movement 46 are displaced in the axial direction in accordance with the oscillation of the mirror. Accordingly, the slide contact for vertical movement 54A and the slide contact for horizontal movement 54B are slid respectively against the resistor for vertical movement 56A and the resistor for horizontal movement 56B. When the slide contact for vertical movement 54A and the slide contact for horizontal movement 54B are slid respectively against the resistor for vertical movement 56A and the resistor for horizontal movement 56B, the voltage between the rear end portion (standard portion) of each of the resistor for vertical movement 56A and the resistor for horizontal movement 56B and each of the slide contact for vertical movement 54A and the slide contact for horizontal movement 54B changes. Accordingly, the above-described detecting mechanism (not shown) detects the mirror surface angle of the mirror by measuring the voltage between the rear end portion of each of the resistor for vertical movement 56A and the resistor for horizontal movement 56B and each of the slide contact for vertical movement 54A and the slide contact for horizontal movement 54B. At this time, the mirror surface angle of the mirror in the vertical direction is detected in response to the displacement of the shaft for the vertical movement 44, and the mirror surface angle of the mirror in the horizontal direction is detected in response to the displacement of the shaft for horizontal movement 46.

Since the mirror surface angle detector 10 in accordance with the present embodiment is provided separately from the mirror surface angle adjusting device 12 and incorporated into the mirror surface angle adjusting device 12, the mirror surface angle adjusting device 12 can also be used in a type of vehicle, which does not have a mirror surface angle detector in the mirror surface angle adjusting device by removing the mirror surface angle detector 10 from the mirror surface angle adjusting device 12 (the mirror surface angle adjusting device used in a type of vehicle which is provided with a mirror surface angle detector in the mirror surface angle adjusting device). In this way, the same mirror surface angle adjusting device 12 can be used in both a type of vehicle which has a mirror surface adjusting device with a mirror surface angle detector and a type of vehicle which does not, so that vehicles of different types can make common use of the mirror surface angle adjusting device 12.

Moreover, the mirror is supported at five points by the holding portion 14, the rod for vertical movement 18, the rod for horizontal movement 20, the shaft for vertical movement 44, and the shaft for horizontal movement 46. The rod for vertical movement 18 and the rod for horizontal movement 20 face the shaft for vertical movement 44 and the shaft for horizontal movement 46 respectively across the center of gravity of the mirror body (the position at which the mirror surface angle adjusting device 12 is held by the holding portion 14), thereby supporting the mirror in a stable manner. Accordingly, chattering caused by vibration of the mirror body, can be prevented from occurring, so that conventional chatter prevention claws are no longer necessary. Therefore, the manufacturing cost thereof can be reduced by reducing the number of component parts.

Further, since the abutting members 52 provided on the tip of each of the shaft for vertical movement 44 and the shaft for horizontal movement 46 are made of stainless steel (or metal) and have a spherical shape, friction caused at the abutting surface can be reduced even if the tip of each of the shaft for vertical movement 44 and the shaft for horizontal movement 46 abuts the resin mirror holder 16 of the mirror. Accordingly, detection accuracy of the mirror surface angle detector 10 can be improved. Furthermore, since the abutting member 52 is stainless, the abutting member 52 can be prevented from being rusted so that the detection accuracy of the mirror surface angle detector 10 can be improved even more, and the manufacturing cost thereof can be reduced.

Moreover, the mirror surface angle detector 10 can be incorporated into the mirror surface angle adjusting device 12 by fitting the engagement claw 28 of the mirror surface angle detector 10 into the engagement hole 22 of the mirror surface angle adjusting device. Accordingly, the number of component parts can be reduced compared to thread fastening assembly, and the assembling performance can be improved, thereby reducing costs. Further, since the protruding portions for fixation 28A formed at the engagement claw 28 are fit together with the recessed portions for fixation 22A formed in the engagement hole 22, the mirror surface angle detector 10 can be firmly fixed to the mirror surface angle adjusting device 12. Still further, since the positioning claws 32 of the mirror surface angle detector 10 are fit into the positioning holes 30 of the mirror surface angle adjusting device 12, the mirror surface angle detector 10 is prevented from coming loose with respect to the mirror surface angle adjusting device 12.

Moreover, since the resistor for vertical movement 56A and the resistor for horizontal movement 56B are held by a single resistor plate 58, it becomes unnecessary to provide two resistor plates as in conventional practice. Thus costs can be reduced by reducing the number of component parts.

Further, displacement of each of the shaft for vertical movement 44 and the shaft for longitudinal movement 46 is guided by the respective insertion of the guide pins 48 of the housing 24 into the shaft for vertical movement 44 and the shaft for horizontal movement 46. Therefore, the ends of the shaft for vertical movement and of the shaft for horizontal movement do not protrude from the guiding holes of the housing as in conventional practice. Accordingly, it is no longer necessary to provide a large space at the opposite side of the mirror in the housing 24, thereby saving space occupied by the mirror surface angle detecting device 10.

The mirror surface angle detector 10 and the mirror surface angle adjusting device 12 in accordance with the present embodiment are used in the mirror body at the right side of a vehicle. However, the mirror surface angle detector 10 and the mirror surface angle adjusting device 12 can also be used in the mirror body at the left side of a vehicle by fixing them within a visor at the left side of the vehicle at a position in which the mirror surface angle detector 10 and the mirror surface angle adjusting device 12 in FIG. 1 are rotated 90° in a counter-clockwise direction. Accordingly, the mirror surface angle adjusting device 12 and the mirror surface angle detector 10 can be used in common by the mirror at the right side of the vehicle and by the mirror at the left side of the vehicle.

In accordance with the present embodiment, although the stainless steel (or metal) abutting members 52 are fixed to the tip of each of the shaft for vertical movement 44 and the shaft for horizontal movement 46, spherical metal abutting members may be held rotatably at the tip of each of the shaft for vertical movement 44 and the shaft for horizontal movement 46. However, even if the metal abutting members are not slid against the resin mirror holder 16 by keeping the abutting member held rotatably at the tip of each of the shaft for vertical movement 44 and the shaft for horizontal movement 46 as described above, the metal abutting members slide against the resin shaft for vertical movement 44 and the shaft for horizontal movement 46, so that the magnitude of friction is the same as that of the friction caused in the present embodiment (when the metal abutting members 52 slide against the resin mirror holder 16, and the metal abutting members 52 do not slide against either of the resin shaft for vertical movement 44 and the shaft for horizontal movement 46).

The present embodiment has a structure in which the engagement hole 22 is provided in the mirror surface angle adjusting device 12, and the engagement claw 28 is provided on the mirror surface angle detector 10. However, another structure, in which the engagement claw is provided on the mirror surface angle adjusting device while the engagement hole is provided in the mirror surface angle detector, is also possible.

Second Embodiment

A second embodiment of the present invention will be described in accordance with FIG. 7 through FIG. 14.

First, an overall structure of an electric retractable door mirror device 110 will be described. In FIG. 14, a perspective view of the door mirror device 110 in accordance with the present embodiment is illustrated, and an exploded perspective view of the door mirror device 110 is illustrated in FIG. 13.

Figure 13:
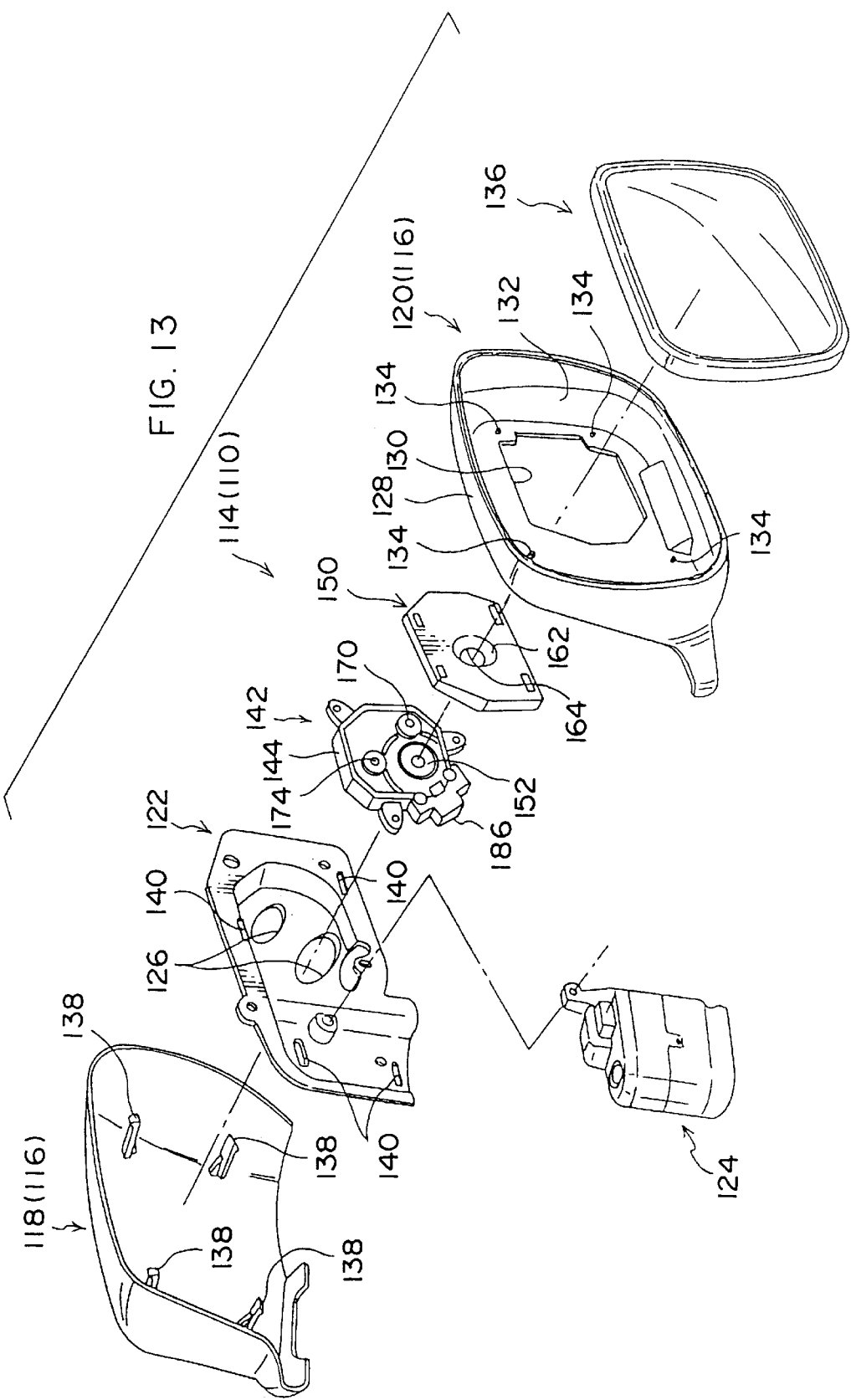
FIG. 13 is an exploded perspective view of a door mirror device.
Figure 14:
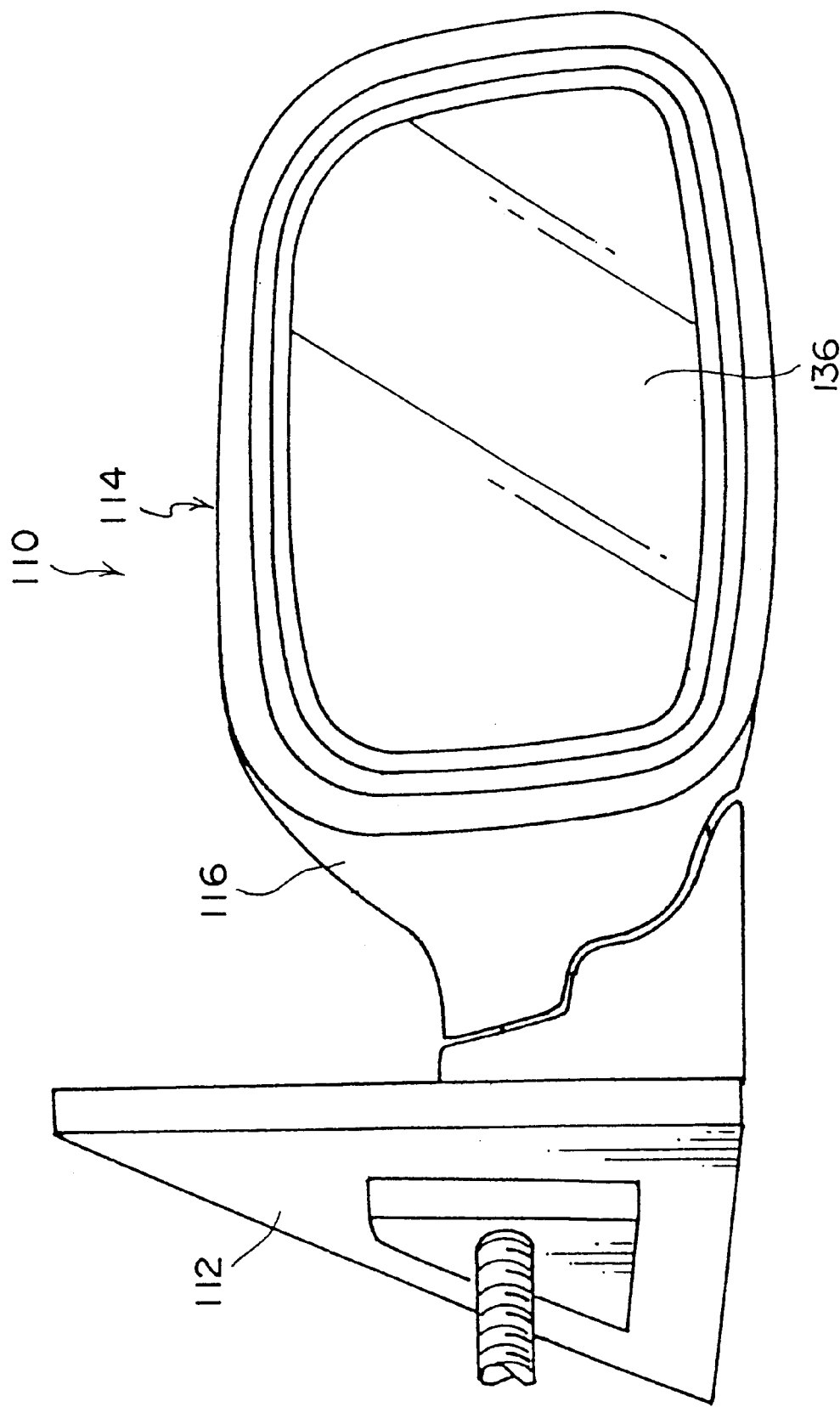
FIG. 14 is a perspective view of a door mirror device.

As shown in FIGS. 13 and 14, the door mirror device 110 is structured with a substantially triangular door mirror base 112 mounted on a corner portion of a vehicle side door, and a door mirror main body 114 supported rotatably around a vertical axis with respect to the door mirror base 112.

The door mirror main body 114 is provided with a resin door mirror visor 116 which forms an outer casing of the door mirror device 110. The door mirror visor 116 has a two-piece structure formed of a front part and a rear part, and is structured with a substantially case-shaped visor cover 118, which forms a front part of the outer casing of the door mirror main body 114 and is open to the vehicle rear side, and a substantially frame-shaped visor rim 120, which forms a rear part of the outer casing of the door mirror main body 114 and is fit in the open side end of the visor cover 118.

A substantially rectangular plate-shaped metal or resin frame 122 is provided between the visor cover 118 and the visor rim 120. On the front (i.e., the side toward the rear of the vehicle) of the frame 122, driving sections such as an electric retracting unit 124 and a mirror drive unit 142 which is described later can be mounted. In the substantially central part of the frame 122, a pair of openings 126 are formed, and two wires (not shown) may be connected to the back (i.e., the side toward the front of the vehicle) of the mirror drive unit 142 through the openings 126. Moreover, on the front (i.e., the side toward the rear of the vehicle) of the mirror drive unit 142, a mirror holder (inner) 150 which is described later can be mounted.

The visor rim 120 disposed at the side toward the rear of the vehicle with respect to the frame 122 is generally structured with a frame portion 128 forming the external contour of the visor rim 120 (the design thereof), and a partition wall 132, which is formed inside the frame portion 128 with a relatively large opening 130 in the middle thereof. Insertion holes 134 are formed at the four corners of the partition wall 132, and the visor rim 120 is fixed to the frame 122 by screwing screws (not shown) in the insertion holes 134.

Moreover, in the rear side of the partition wall 132 in the visor rim 120, a mirror 136 which serves as a "mirror" for visually confirming the rear field of vision of the vehicle is disposed. The mirror 136 is connected to the mirror holder 150 of the mirror drive unit 142 through the opening 130 formed in the partition wall 132.

Rib-reinforced resin claws 138 are vertically provided at the four corners of the bottom portion of the visor cover 118 which is disposed toward the front of the vehicle with respect to the frame 122. Long holes 140 are formed at the four corners of the frame 122 to accommodate the claws 138. When the resin claws 138 are elastically anchored in the long holes 140, the visor cover 118 is fixed to the frame 122 in a state of being fitted into the visor rim 120.

Figure 10:
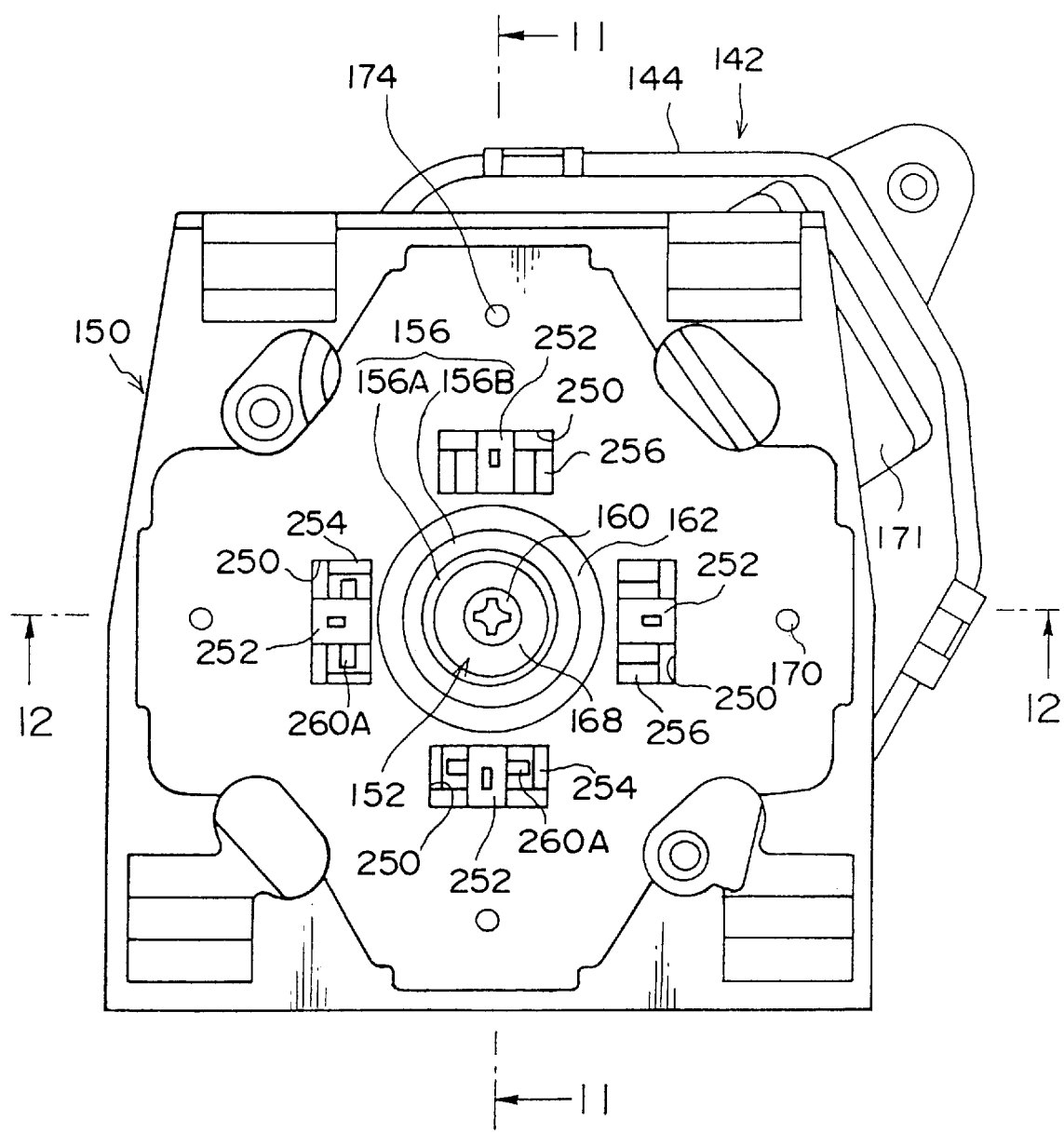
FIG. 10 is a plan view of a mirror driving unit into which a mirror holder is incorporated.
Figure 11:
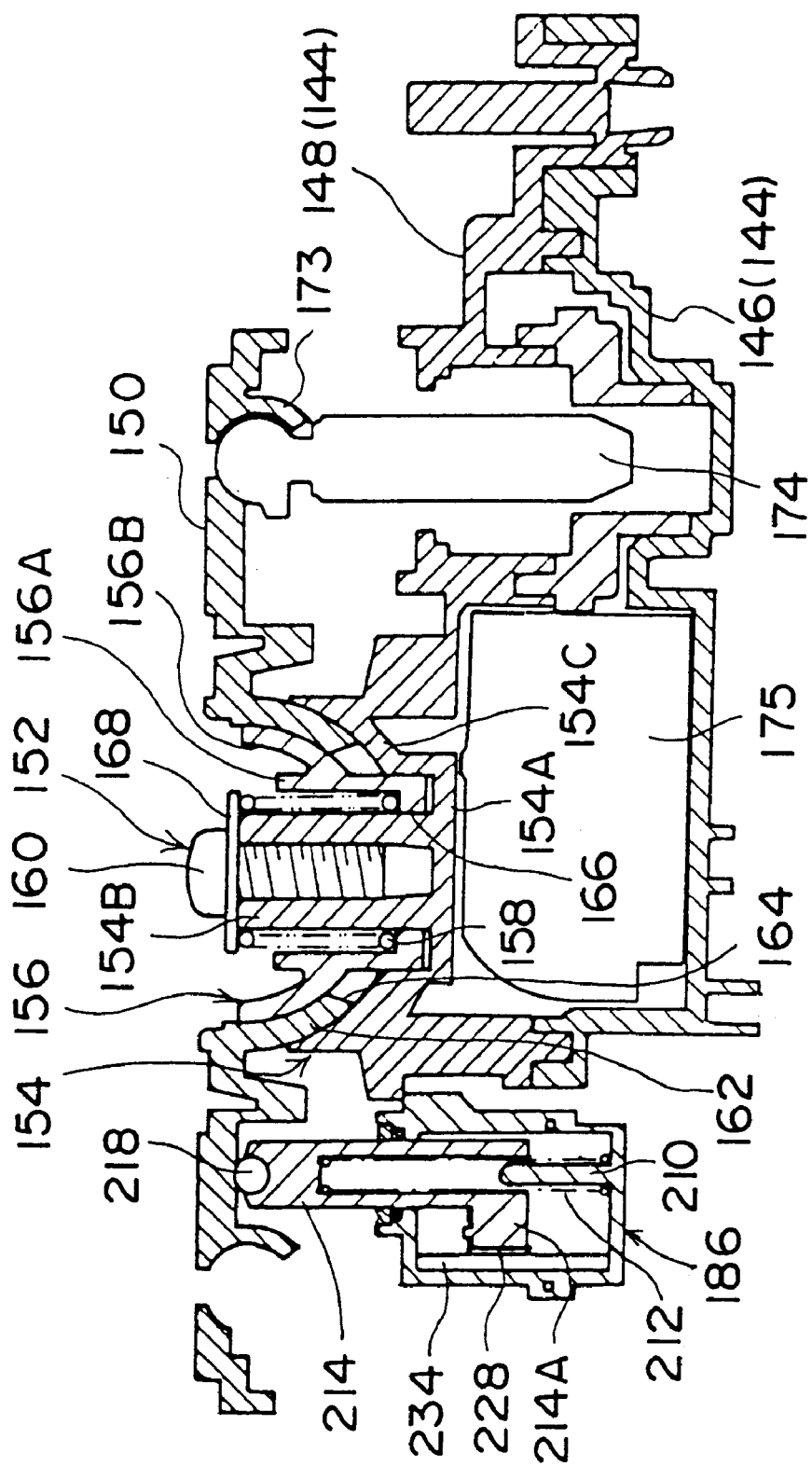
FIG. 11 is a cross sectional view seen from the direction of arrows along line 11—11 in FIG. 10.
Figure 12:
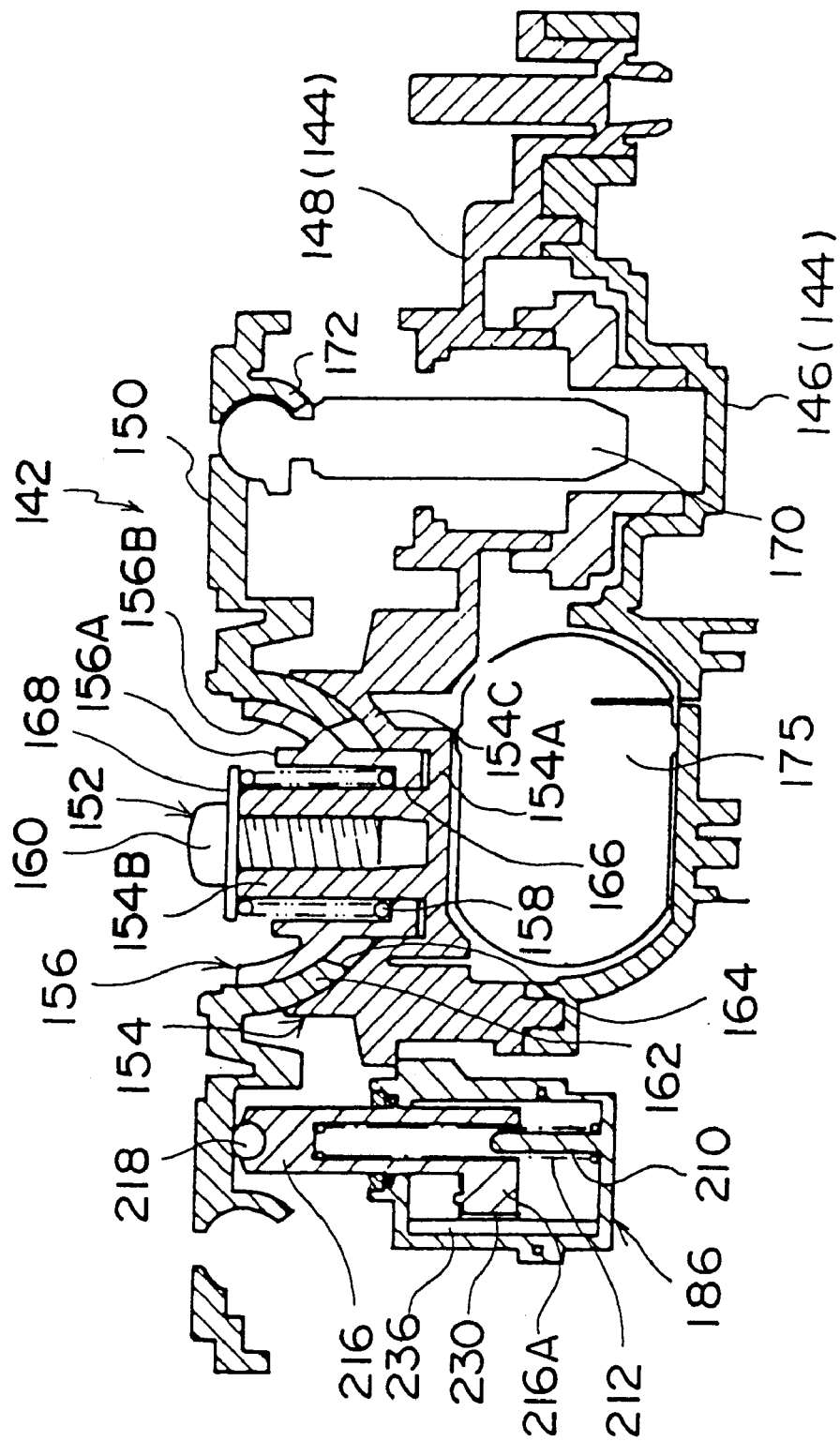
FIG. 12 is a cross sectional view seen from the direction of arrows along line 12—12 in FIG. 10.

A structure of the mirror drive unit (mirror surface angle adjusting device) 142 will be described hereinafter. This structure will be explained by using the mirror drive unit 142 loaded in the right-side door mirror device 110 as an example. In FIG. 10, a plan view of the mirror drive unit 142 is shown in a state in which the mirror holder 150 is incorporated in the mirror drive unit 142. In FIGS. 11 and 12, longitudinal sectional views of the mirror drive unit 142 are shown.

As shown in these figures, the mirror drive unit 142 is provided with a housing 144 which generally has a relatively thin, square plate shape. The housing 144 is structured with a front housing 146, which is disposed toward the front of the vehicle in the state of being incorporated in the mirror drive unit 142, and a rear housing 148 which is disposed toward the rear of the vehicle. The front housing 146 and the rear housing 148 are integrated by being fit together with each other to form an outer casing unit.

At an inner, central portion of the mirror drive unit 142, a pivot section 152 is provided for supporting, in an oscillating manner, the mirror holder 150 (shown also in FIG. 7) which is provided as a "holding member" formed with a substantially rectangular plate shape. Broadly speaking, the pivot section 152 is structured with a spherical surface receiving section 154, which is integrally formed with the rear housing 148 and is a semi-spherical recessed portion with a base, a retainer 156, which is formed smaller than the spherical surface receiving section 154 and is mounted on the inner side of the spherical surface receiving section 154, and compression coil springs 158, which urge the retainer 156 to the spherical surface receiving section 154 by applying a pressure to the retainer 156, and a screw 160.

To provide a supplementary explanation of the details of the structure, the spherical surface receiving section 154 is structured with a cylindrical holding portion 154A having a relatively shallow base, a long and slender cylindrical boss 154B formed at the center portion of the shaft of the holding portion 154A, and a spherical surface holding portion 154C extending outward in the radial direction from the holding portion 154A. The retainer 156 is structured with a cylindrical shaft portion 156A which has a base and is inserted into the holding portion 154A of the spherical surface receiving section 154, and a spherical pressing portion 156B extending outward in the radial direction from the central part of the shaft portion 156A. Further, a semi-spherical shaft supporting portion 162 formed at the substantially central part of the mirror holder 150 is interposed between the spherical surface supporting portion 154C of the spherical surface receiving section 154 and the spherical surface pressing portion 156B of the retainer 156.

A penetration hole 164 having a diameter larger than the outer diameter of the shaft portion 156A of the retainer 156 is formed at the center of the shaft supporting portion 162 in the mirror holder 150. A boss insertion hole 166 for passing the boss 154B therethrough is formed at the bottom portion of the shaft portion 156A in the retainer 156. In a state in which the boss 154B is inserted into the boss insertion hole 166, the compression coil spring 158 is wound around an inner circumferential side of the shaft portion 156A of the retainer 156, and the screw 160 is screwed into the boss 154B via a washer 168.

In this way, the washer 168 functions as a spring seat, and urging force of the compression coil spring 158 is exerted on the shaft supporting portion 162 of the mirror holder 150 via the retainer 156. Accordingly, the shaft supporting portion 162 of the mirror holder 150 is supported so as to be capable of oscillation by the spherical surface receiving section 154. The position at which the mirror holder 150 (and the mirror 136 as well) is held by the pivot section 152 corresponds to the center of gravity of the mirror 136.

A second drive rod 170, which may be understood as "a second adjusting means" in a broad sense, for adjusting the angle of the mirror 136 in the horizontal direction around the pivot section 152 is provided at the side portion of the mirror drive unit 142. The second drive rod 170 is moved in the axial direction by a worm or worm wheel mechanism when a driving force of a second motor 171 (see FIG. 10) is applied to the second drive rod 170. The tip of the second drive rod 170 is supported (connected) rotatably by means of a shaft at a shaft supporting portion 172 formed at the back of the mirror holder 150.

Further, a first drive rod (a first adjusting means) 174 for adjusting the angle of the mirror 136 in the vertical direction around the pivot section 152 is provided at the upper portion of the mirror drive unit 142. The driving mechanism of the first drive rod 174 is similar to that of the above-described second drive rod 170. That is, the first drive rod 174 is moved in the axial direction by a worm or worm wheel mechanism when a driving force of a first motor 175 is applied to the first drive rod 174. The tip of the first drive rod 174 is supported (connected) rotatably by means of a shaft at a shaft supporting portion 173 formed at the back of the mirror holder 150.

A structure of a mirror surface angle detecting unit 186 (mirror surface angle detector) will be described hereinafter. As shown in FIG. 13 and other figures, the mirror surface angle detecting unit 186, which is structured separately from the mirror drive unit 142, is mounted in the vicinity of the pivot section 152 in the mirror drive unit 142.

Figure 8:
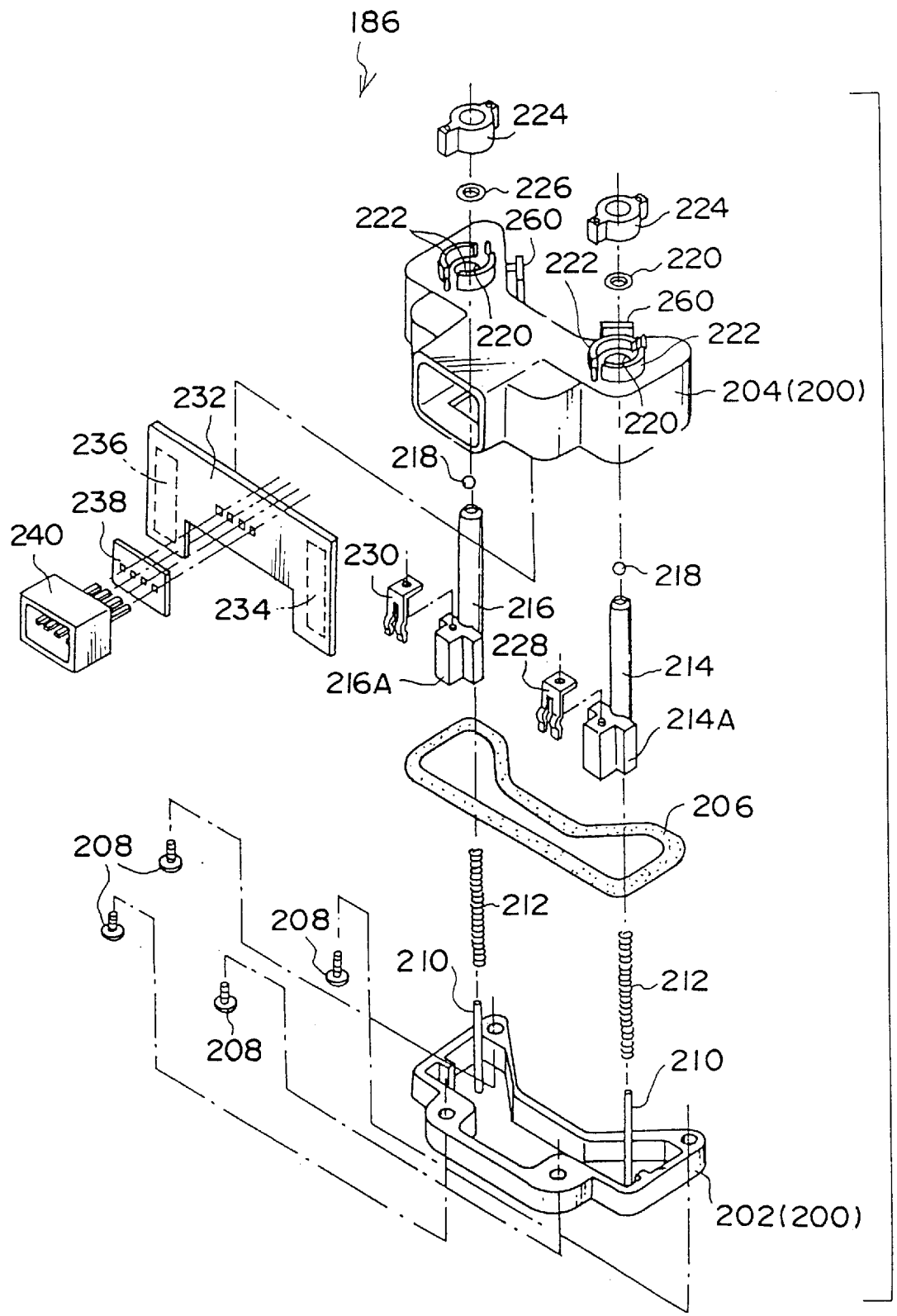
FIG. 8 is an exploded perspective view of the detecting unit illustrated in FIG. 7.
Figure 9:
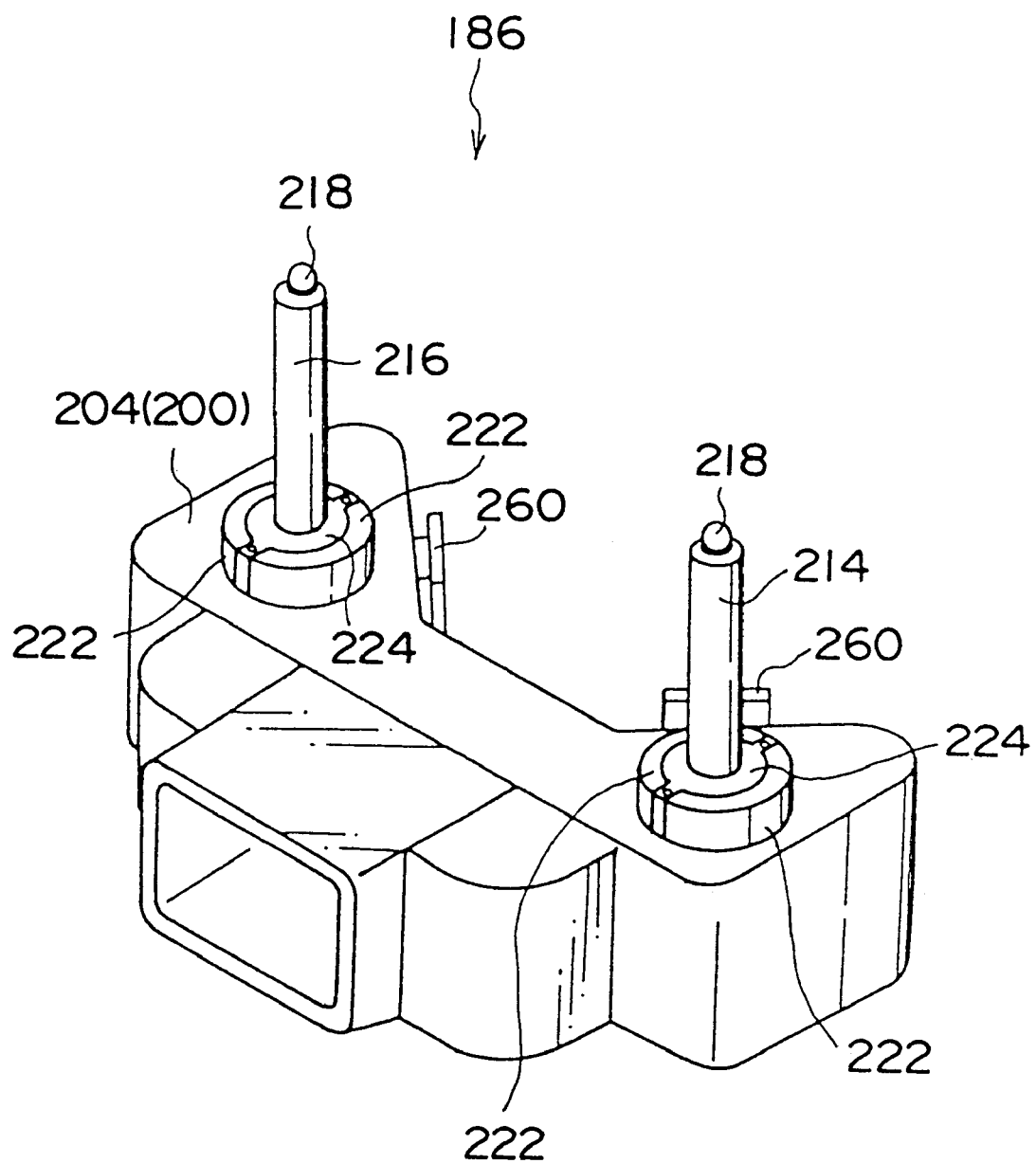
FIG. 9 is a perspective view of the detecting unit illustrated in FIG. 7.

In FIG. 9, an overall perspective view of the mirror surface angle detecting unit 186 is shown, and in FIG. 8, an exploded perspective view of the mirror surface angle detecting unit 186 is shown. In FIGS. 11 and 12, longitudinal sectional views of the interior of the mirror surface angle detecting unit 186 are shown, albeit partially.

As shown in these figures, the mirror surface angle detecting unit 186 is provided with a housing 200, the middle portion of which is recessed to accommodate the cornered shape of the mirror drive unit 142. In an assembled state, the housing 200 is divided in two pieces in the longitudinal direction of the vehicle, and is structured with a front housing 202 and a rear housing 204. A frame-shaped waterproof packing 206 is disposed between the two housings, and the front housing 202 is fixed to the rear housing 204 by vises 208 in a state in which the waterproof packing 206 is sandwiched therebetween.

A pair of guide pins 210 are vertically disposed at both sides of the bottom portion of the front housing 202. A compression coil spring 212 is wound around each of the guide pins 210, and the guide pins 210 are inserted into the shaft for vertical movement 214 and the shaft for horizontal movement 216 which have substantially cylindrical rodlike shapes. Balls 218 are held in a state in which the balls are capable of rolling freely at the tip of each of the shaft for vertical movement 214 and the shaft for horizontal movement 216. Moreover, in the rear housing 204, shaft insertion holes 220 are formed at respective positions coaxial with the guide pins 210, and about half of the upper part of each of the shaft for vertical movement 214 and the shaft for horizontal movement 216 protrudes from the shaft insertion holes 220. Pairs of substantially semicylindrical guide walls 222, the members of which pairs oppose one another to form respective sets, are vertically disposed around each of the shaft insertion holes 220. Within each pair of the guide walls 222, substantially cylindrical bushings 224 are attached by being fit together with the guide walls 222 via an O-ring 226.

With this structure, each of the shaft for vertical movement 214 and the shaft for horizontal movement 216 is constantly pressed and urged toward the extending direction from the housing 200 due to the application of an urging force of the compression coil spring 212. Accordingly, the balls 218 which are held at the tip of each of the shaft for vertical movement 214 and the shaft for horizontal movement 216 constantly abut the back of the mirror holder 150.

Moreover, block-shaped contact fixing portions 214A and 216A are formed at respective base ends of the shaft for vertical movement 214 and of the shaft for horizontal movement 216. At the contact fixing portions 214A and 216A, a slide contact for vertical movement 228 and a slide contact for horizontal movement 230 are fixed, respectively.

Further, a substantially rectangular resistor plate 232 is disposed in the housing 200. A resistor for vertical movement 234 and a resistor for horizontal movement 236 are provided at respective sides of the resistor plate 232. The slide contact for vertical movement 228 is brought into contact with the resistor for vertical movement 234, and the slide contact for horizontal movement 230 is brought into contact with the resistor for horizontal movement 236. Furthermore, a connector 240 is mounted in the middle part of the resistor plate 232 via a spacer 238.

Figure 7:
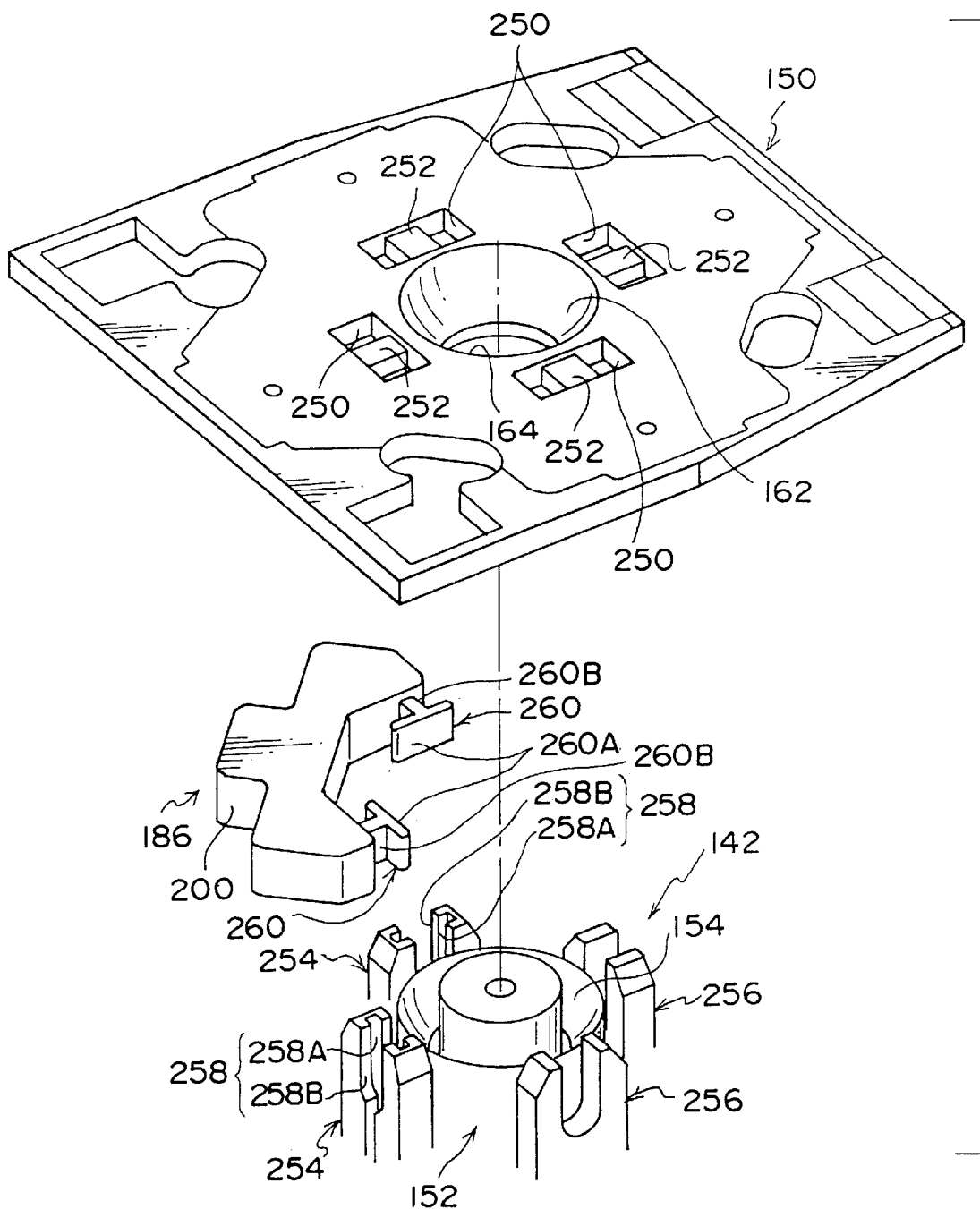
FIG. 7 is an exploded perspective view of a mirror driving unit which is provided with a mirror surface angle detecting unit according to a second embodiment of the present invention.

As shown in FIG. 7, four rectangular holes 250 are formed at 90° intervals around the shaft supporting portion 162, which is formed in the middle part of the above-described mirror holder 150. A bridge portion 252 is formed in the middle part of each of the rectangular holes 250, so that the opening portion of the rectangular hole 250 is divided into two in the longitudinal direction of the opening.

In accordance with this structure, four ribs functioning as "restricting portions" (depending on the structure thereof, hereinafter referred to as "first ribs 254" and "second ribs 256") are vertically provided at 90° intervals around the pivot section 152 of the mirror drive unit 142 which supports the mirror holder 150 so as to be capable of oscillation. All four of the first ribs 254 and second ribs 256 are formed roughly in the shape of a tuning fork, and are respectively inserted into the rectangular holes 250 formed in the mirror holder 150.

In a state in which the first ribs 254 and the second ribs 256 are inserted into the rectangular holes 250 of the mirror holder 150, the mirror holder 150 is capable of oscillation around the pivot section 152 in the vertical direction and in the horizontal direction within a prescribed range. That is, since the outer peripheral surfaces of the first ribs 254 and of the second ribs 256 intervene with the inner surfaces of the rectangular holes 250, the oscillation range of the mirror holder 150 is restricted within a prescribed range, so that the first ribs 254 and the second ribs 256 function as detents of the mirror holder 150.

Moreover, engagement holes 258 which serve as "portions to be engaged" are formed in the pair of adjacent first ribs 254. The engagement hole 258 is structured with an engagement groove 258A, which is formed in a middle portion in the direction of the thickness of the rib and whose both ends are closed, and a slit 258B which is cut in the direction of the thickness of the rib and whose both ends are open. Accordingly, the engagement groove 258A and the slit 258B are connected to each other.

A pair of engagement protrusions 260 which function as "mounting legs" and are formed on the housing 200 of the mirror surface angle detecting unit 186 are respectively inserted in the first engagement holes 258 having the structure described above. More precisely, at both sides of the recessed portion side of the housing 200, a pair of engagement protrusions 260 are formed in a substantially T-shape when seen in plan view. The engagement protrusions 260 are structured with an engagement portion 260A, which is disposed parallel to the end face of the housing 200 and is inserted into the engagement groove 258A, and a supporting portion 260B which is formed perpendicular to the end face of the housing 200 and is passed through the slit 258B. By inserting the pair of engagement protrusions 260 into the pair of first engagement holes 258, the mirror surface angle detecting unit 186 is mounted to the mirror drive unit 142.

An operation and effect of the present embodiment is described hereinafter.

Angle adjustment of the mirror 136 using the mirror drive unit 142 will be performed as follows. An explanation will be conducted by using the mirror drive unit 142 loaded in the right-side door mirror device 110 as an example. When the driving force of the second motor 171 is applied to the second drive rod 170, the second drive rod 170 moves in the axial direction. Since the tip of the second drive rod 170 is supported (connected) rotatably by a shaft at the shaft supporting portion 172 formed at the back of the mirror holder 150, when the second drive rod 170 moves in the axial direction, the mirror holder 150 is oscillated in the horizontal direction around the pivot section 152 at an angle corresponding only to the stroke thereof. Accordingly, the mirror surface angle of the mirror 136 connected to the mirror holder 150 is adjusted to a desired angle in the horizontal direction.

On the other hand, when the driving force of the first motor 175 is applied to the first drive rod 174, the first drive rod 174 moves in the axial direction. Since the tip of the first drive rod 174 is supported (connected) rotatably by a shaft at the shaft supporting portion 173 formed at the back of the mirror holder 150, when the first drive rod 174 moves in the axial direction, the mirror holder 150 is oscillated in the vertical direction around the pivot section 152 at an angle corresponding only to the stroke thereof. Accordingly, the mirror surface angle of the mirror 136 connected to the mirror holder 150 is adjusted to a desired angle in the vertical direction.

Moreover, detection of the mirror surface angle using the mirror surface angle detecting unit 186 is performed as follows. When the mirror holder 150 is oscillated in the vertical direction by the mirror drive unit 142, the shaft for vertical movement 214 of the mirror surface angle detecting unit 186 is accordingly moved in the axial direction by the urging force of the compression coil spring 212. As a result, the slide contact for vertical movement 228 slides on the resistor for vertical movement 234, and the voltage is varied. The mirror surface angle of the mirror 136 in the vertical direction can be detected from the variation in voltage.

On the other hand, when the mirror holder 150 is oscillated in the horizontal direction by the mirror drive unit 142, the shaft for horizontal movement 216 of the mirror surface angle detecting unit 186 is accordingly moved in the axial direction by the urging force of the compression coil spring 212. As a result, the slide contact for. horizontal movement 230 slides on the resistor for horizontal movement 236, and the voltage is varied. The mirror surface angle of the mirror 136 in the horizontal direction can be detected from the variation in voltage.

While the above-described mirror holder 150 is oscillated around the pivot section 152, the oscillation range of the mirror holder 150 is restricted within a prescribed range by the pair of first ribs 254 and the pair of second ribs 256 (four in total) provided around the pivot section 152. In the present embodiment, the pair of the first ribs 254 are utilized to enable mounting of the mirror surface angle detecting unit 186 onto the mirror drive unit 142.

That is, in the present embodiment, a pair of engagement protrusions 260 formed in a substantial T-shape are provided outside the housing 200 of the mirror surface angle detecting unit 186, and each of the engagement protrusions 260 is inserted into the engagement holes 258, each consisting of the engagement groove 258A and the slit 258B, which are disposed on each of the pair of first ribs 254 of the mirror drive unit 142. Accordingly, the mirror surface angle detecting unit 186 is mounted on the mirror drive unit 142. By also utilizing (sharing) the pair of first ribs 254 (functioning as detents of the mirror holder 150) provided in the mirror drive unit 142 as portions to which the mirror surface angle detecting unit 186 are mounted, it becomes possible for the mirror surface angle detecting unit 186 to be mounted to the mirror drive unit 142 without an increase in the number of component parts.

Therefore, in accordance with the present invention, the overall dimensions of the device can be made smaller, as compared with a case in which a portion to be mounted is provided separately in the mirror drive unit 142, thereby saving space (reduction in installation area). As a result, in accordance with the present embodiment, the whole device (i.e., the entire mirror drive unit 142 and mirror surface angle detecting unit 186) can be reliably housed within the door mirror visor 116 of the door mirror device 110.

Moreover, in accordance with the present embodiment, since the pair of first ribs 254 (functioning as detents of the mirror holder 150) provided in the mirror drive unit 142 are also utilized (shared) as portions to which the mirror surface angle detecting unit 186 is mounted, the mirror surface angle detecting unit 186 can be mounted closer to the pivot section 152. As a result, an effect can be achieved which improves the sensing accuracy of the mirror surface angle detecting unit 186.

In the above-described present embodiment, the first ribs 254 and the second ribs 256, four in total, are provided around the pivot section 152 since this structure offers the best balance in terms of detents for oscillation of the mirror holder 150 in both the vertical and horizontal directions. However, the present invention is not limited to the same as long as there are two or more ribs. That is, if there is at least one rib serving as a detent for oscillation of the mirror holder 150 in the vertical direction and at least one rib serving as a detent for oscillation of the mirror holder 150 in the horizontal direction, a minimum function as a detent can be secured. In this case, it is possible to provide a portion to which the mirror surface angle detecting unit 186 is mounted to one or two ribs among them.

Moreover, in the above-described present embodiment, a pair of engagement protrusions 260 are formed in the mirror surface angle detecting unit 186 side, and the engagement protrusions 260 are inserted into the engagement holes 258 provided in a pair of first ribs 254. However, the present invention is not limited to the same, and various combinations for the structure of the "mounting legs" and "portions to be mounted" can be employed.

Further, in the above-described present embodiment, a mechanism is adopted in which the mirror surface angle is adjusted by moving the first drive rod 174 and the second drive rod 170 in the axial direction, respectively. However, the present invention is not limited to the same, and any mechanism (e.g., a mechanism using a cam, a rack-and-pinion mechanism, and the like) can be applied as long as the mechanisms can adjust the mirror surface angle.

Furthermore, in the above-described present embodiment, the mirror surface angle is adjusted by moving the shaft for vertical movement 214 and the shaft for horizontal movement 216 in the axial directions, respectively. However, the present invention is not limited to the same, and any structure can be applied as long as the mirror surface angle can be detected in the structure.

Still further, in the above-described present embodiment, the present invention is applied to the door mirror device 110. However, the present invention is not limited to the same, and it can also be applied to fender mirrors.

What is claimed is:

1. An external rear-view mirror device for a vehicle comprising:

a holder having opposite sides, one side being a mirror mounting surface on which a mirror is mounted;

a base disposed at the side of the holder opposite the mirror mounting surface, the base being adapted for mounting to a vehicle;

a spherical bearing portion connecting the holder to the base so that the holder is pivotable around two axes that are substantially orthogonal to one another; and a detector detachably mounted on the base and operable for producing mirror position information relative to each of the axes, and wherein an engagement structure detachably mounts the detector on the base, the engagement structure including a resilient member permitting detachable mounting by resilient compression of the resilient member and sudden expansion to a less compressed state.

2. An external mirror device according to claim 1, wherein the resilient member comprises a claw portion provided on one of the detector and the base, and a corresponding engagement portion provided on the other of the detector and the base.

3. An external mirror device according to claim 1, further comprising a restricting portion for restricting pivotable motion of the holder, and which is provided at the base and protrudes toward the holder.

4. An external mirror device according to claim 3, wherein a fitting structure detachably mounts the detector mounted on the base such that the detector can be detached and mounted via a resilient snapping action.

5. An external mirror device according to claim 4, wherein the fitting structure comprises a leg portion provided on one of the detector and the restricting portion, and a corresponding portion provided on the other of the detector and the restricting portion.

6. An external mirror device according to claim 1, wherein the two axes are a substantially horizontal axis and a substantially vertical axis when the device is mounted on a vehicle and the vehicle is on a substantially level surface.

7. An external mirror device according to claim 1, further comprising a driving section including two rods for driving the holder in a pivotal manner, each rod having opposite ends, one end of each of the rods being connected to the holder and the other end being engaged with the base.

8. An external mirror device according to claim 1, wherein the detector comprises a body, electrical resistors, and two shafts, the two shafts being slidably supported with respect to the body of the detector, each shaft including opposite ends, one end of each of the shafts being engaged with the holder and the other end being engaged with a corresponding electrical resistor provided at the detector body.

9. An external mirror device according to claim 8, wherein said one end of each of the shafts is engaged with the holder via a movable ball placed therebetween.

10. An external mirror device according to claim 8, wherein a point of engagement between said one end of each of the shafts and the holder exists substantially on each of the two axes.

11. An external mirror device according to claim 10, further comprising two rods for driving the holder in a pivotal manner, each rod having opposite ends, one end of each of the rods being connected to the holder and the other end being engaged with the base.

12. An external mirror device according to claim 11 wherein, a connecting point of said one end of each of the rods and the holder exists substantially on each of the two axes.

13. An external rear-view mirror device for a vehicle comprising:
   holder having opposite sides, one side being a mirror mounting surface on which a mirror is mounted;
   base disposed at the side of the holder opposite the mirror mounting surface, the base being adapted for mounting to a vehicle;
   spherical bearing portion connecting the holder to the base so that the holder is pivotable around two axes that are substantially orthogonal to one another;
   driving section having two rods for driving the holder in a pivotal manner, each rod having opposite ends, one end of each of the rods being connected to the holder and the other end being engaged with the base; and
   a detector for detecting mirror position relative to each of the axes, the detector comprising a body, electrical resistors, and two shafts, the two shafts being slidably supported with respect to the body of the detector, one end of each of the shafts being engaged with the holder and the other end being engaged with a corresponding electrical resistor provided at the detector body, and
   wherein an engagement structure detachably mounts the detector assembly on the base, the engagement structure including a resilient member permitting detachable mounting by resilient compression of the resilient member and sudden expansion to a less compressed state.

14. An external mirror device according to claim 13, wherein said one end of each of the shafts is engaged with the holder via a movable ball placed therebetween.

15. An external mirror device according to claim 13, wherein a point of engagement between said one end of each of the shafts and the holder exists substantially on each of the two axes.

16. An external mirror device according to claim 13 wherein, a connecting point of said one end of each of the rods and the holder exists substantially on each of the two axes.

17. A detector for detecting mirror position in an external rear-view mirror device of a vehicle, the rear-view device having a base connected to the vehicle, and a mirror in a holder, with the holder pivotally supported on the base, thereby permitting mirror movement around substantially orthogonal axes, the detector comprising:
   (a) a body adapted for detachable mounting to the base of the rear-view mirror device;
   (b) two electrical resistors provided at the body; and
   (c) two shafts supported slidably relative to the body, each shaft having opposite ends with one end of each shaft being engageable with the holder, and the other end of each shaft being engaged with one of the resistors, wherein each shaft is engaged with a different resistor, and
   wherein an engagement structure detachably mounts the detector assembly on the base, the engagement structure including a resilient member permitting detachable mounting by resilient compression of the resilient member and sudden expansion to a less compressed state.

18. A detector according to claim 17, wherein at said one end of each of the shafts which is engageable with the holder, a movable ball is provided.

19. A detector according to claim 17, wherein a point of engagement between said one end of each of the shafts and the holder exists substantially on each of the two axes.

* * * * *